US009031990B2

(12) United States Patent
Scott et al.

(10) Patent No.: US 9,031,990 B2
(45) Date of Patent: May 12, 2015

(54) DATA PROCESSING SYSTEM FOR MANUFACTURING QUALITY INSPECTION MANAGEMENT SYSTEM

(75) Inventors: Terrence Stanley David Scott, Toronto (CA); Jason Chan, Newmarket (CA); Hector Ammon Garcia, Aurora (CA)

(73) Assignee: Q2 Management Inc., Newmarket, Ontario (CA)

( * ) Notice: Subject to any disclaimer, the term of this patent is extended or adjusted under 35 U.S.C. 154(b) by 815 days.

(21) Appl. No.: 12/852,920

(22) Filed: Aug. 9, 2010

(65) Prior Publication Data
US 2011/0055205 A1 Mar. 3, 2011

Related U.S. Application Data

(60) Provisional application No. 61/233,000, filed on Aug. 11, 2009.

(51) Int. Cl.
*G06F 17/00* (2006.01)
*G06Q 10/06* (2012.01)

(52) U.S. Cl.
CPC ...... *G06Q 10/06395* (2013.01); *G06Q 10/0631* (2013.01)

(58) Field of Classification Search
CPC ............ G06Q 10/06395; G06Q 10/0631; G06F 17/242; G06F 17/30011; G06F 17/30097
USPC .................. 707/792; 705/80, 7.41
See application file for complete search history.

(56) References Cited

U.S. PATENT DOCUMENTS

| | | | |
|---|---|---|---|
| 5,717,607 A * | 2/1998 | Hu ................................. | 702/123 |
| 5,930,801 A * | 7/1999 | Falkenhainer et al. ............... | 1/1 |
| 6,236,901 B1 * | 5/2001 | Goss .............................. | 700/95 |
| 6,381,594 B1 * | 4/2002 | Eichstaedt et al. ................ | 1/1 |
| 6,516,351 B2 * | 2/2003 | Borr .............................. | 709/229 |
| 7,664,829 B2 * | 2/2010 | Yamamoto et al. ............. | 709/217 |
| 8,370,912 B2 * | 2/2013 | Turnbull et al. ................. | 726/7 |
| 2007/0061186 A1 * | 3/2007 | Boraas et al. ................... | 705/10 |
| 2008/0275714 A1 * | 11/2008 | Martinez .......................... | 705/1 |

OTHER PUBLICATIONS

Laurent et al. (EP 1,533,724).*
Combinatorial auctions for supply chain formation William E. Walsh, Michael P. Wellman & Fredrik Ygge (2000).*

* cited by examiner

*Primary Examiner* — Hosain Alam
*Assistant Examiner* — Bruce Witzenburg
(74) *Attorney, Agent, or Firm* — Jaeckle Fleischmann & Mugel, LLP

(57) ABSTRACT

Disclosed is a computer readable medium containing a program product provided for the development, receipt, storage, and presentation of the data necessary for delivery of quality assurance test activities. In particular, the program product allows users to create quality assurance testing criteria and procedures; define, document, and approve specific actions and allocate unique categorization codes. The program product includes a module for the creation and storage of pre-defined text and image elements for the provision of enterprise wide knowledge sharing. The program product applies calculations to consolidate and convert data into statistical reports utilizing a variety of user-defined criteria, including but not limited to component descriptor, quality criteria, time period and manufacturer. The program product also accepts, consolidates and calculates post-production quality resource utilization/costs, segregated periodically and/or consolidated, enabling stakeholders to determine appropriate corrective actions based on ongoing quality assurance testing outcomes.

59 Claims, 14 Drawing Sheets

Element Manager — 790

Categories:
- ● Q2
- ○ Site Specifics

Administration
Customer Specific
Fasteners
Foam Products
FS-Cautions
Function/Cycling
Gauge Inspections
Packaging
Plastic
Rework

[ New ] [ Update ] [ Delete ]

Elements:

| NAME | DESCRIPTION |
|---|---|
| Cavity Identification | Visually inspect for the presence of cavity identification number(s): CID. See boundary sample/illustration for location(s). Reject/Accept only those components with the following CID number(s): XXXXX, XXXXX, XXXXX. If CID is acceptable witness mark with a black permanent marker / blue paint marker / white wax pencil at a location(s) adjacent to CIDF. If CID is not acceptable then reject component for review (do not witness mark). |
| Color mismatch/inconsistencies | Visually inspect for the presence of incorrect/inconsistent color. If color is incorrect / inconsistent as set forth in boundary sample/illustration then reject and do not witness mark. If color is correct/consistent in accordance with boundary sample/illustration then accept and witness mark with... |

[ New ] [ Update ] [ Delete ]

DATA PROCESSING SYSTEM FOR MANUFACTURING QUALITY INSPECTION MANAGEMENT SYSTEM

CROSS-REFERENCE TO RELATED APPLICATIONS

This application claims the benefit of U.S. Provisional Application No. 61/233,000, filed on 11 Aug. 2009, the content of which is incorporated by reference in its entirety.

FIELD OF THE INVENTION

The present invention relates to the field of providing quality control management tools.

BACKGROUND OF THE INVENTION

As a manufacturing supply chain matures, supplier businesses become more likely to outsource "non-core" processes or activities where they lack competitive advantages. These supply chain participants will focus their limited resources on those activities where cost savings or proprietary knowledge creates the most favorable operating environment. The automotive manufacturing industry is a prime example of a mature manufacturing supply chain. After a century of automobile production, the supply chain is segmented into supplier tiers: tier 3 suppliers provide raw components such as fasteners, cloth, galvanized tubing, etcetera to tier 2 suppliers; tier 2 suppliers apply processes to these components, in turn supplying components such as seating tracks, wire frames, electrical harnesses, etcetera to tier 1 suppliers; tier 1 suppliers apply processes to these components, in turn supplying components such as seating assemblies, exhaust systems, suspension systems, etcetera to original equipment manufacturers (OEMs); OEMs utilize components from tier 1 suppliers to assemble the final automobile product. The focus of optimizing resource utilization ensures that a business will always look to outsource activities where they do not enjoy a competitive advantage. Due to the trend in global outsourcing, manufacturers in a supply chain may locate facilities or production partners anywhere in the world—often in cost-effective jurisdictions.

Manufacturing supply chains often utilize two additional manufacturing techniques to minimize production costs; "Just-in-Time" manufacturing (or JIT), and "Lean Manufacturing" (LM). Essentially JIT and LM impose demands on suppliers to ensure a reduction in costs by eliminating excess inventories (JIT) and excess materials or capacity in production (LM). The disadvantage of both JIT and LM are that they are contemporaneously characterized by the absence of resources when required to manage unplanned circumstances such as the receipt of materials or the manufacture of components that fail to meet design specifications. Limited resources, strict production timelines and high quality standards have interrelated to create a demand for post-production quality assurance capacity. Just as in outsourcing components, processes and/or activities in which the manufacturer lacks a competitive advantage, post-production quality assurance capacity is similarly outsourced.

Companies offering post-production quality assurance services work with a diverse and geographically diffuse audience. The process of service requires coordination of quality testing activity; negotiating contracts, establishing error free quality testing methodology, recording and presenting quality test data, and cost management.

BRIEF SUMMARY OF THE INVENTION

The present invention is a data processing system and method for monitoring and recording information flow and data related to quality testing of manufactured components. The data processing system allows users to create quality assurance testing methodologies and criteria, define specific actions and allocate unique categorization codes to testing failures. The data processing system allows geographically diverse stakeholders to review and approve these definitions contemporaneously via an Internet-based user interface. The data processing system accepts quality assurance testing results via portable computing applications deployed to quality assurance testers. The data processing system applies calculations to consolidate and convert raw data into statistical results delineated by a variety of user-defined criteria comprising component descriptor, quality criteria, assembly, production plant, vendor, and/or assembler. In particular, the statistical output may be accessed in real-time by geographically diverse stakeholders by a user interface for immediate review and action. The data processing system also accepts, consolidates and calculates post-production quality costs, each day and over time, thus enabling stakeholders to determine appropriate corrective actions based on ongoing quality assurance results. The data processing system also tracks all relevant historical data so that aggregate time-frame statistical or resource utilization/cost information may be viewed. The data processing system will allow users to manage resources comprising human quality control inspectors, operating supplies, travel expenses, freight charges and warehouse utilization.

One aspect of the present invention is a method to organize and coordinate quality testing activities of a plurality of users for one or more manufactured components. The method comprises: (a) providing a main processor coupled to multiple memory devices containing multiple databases, wherein the main processor is configured to communicate with a plurality of users; (b) receiving to the main processor a request from at least one of the plurality of users to provide quality testing activity support associated with one or more manufactured components; (c) creating a contract based upon information provided by the at least one user; (d) providing the contract to a plurality of users in a plurality of different document mediums for agreement by the plurality of users; (e) providing notice to the plurality of users responsive to agreement by the plurality of users to the contract; (f) providing an interface to the plurality of users to receive and store testing data in the multiple databases relating to the quality testing activities performed, wherein the data is capable of being retrieved by the plurality of users; (g) providing a means to retrieve stored quality testing activity data.

In another aspect, the present invention is directed to a method to retrieve, calculate, and present data relating to quality testing activities of one or more manufactured components. The method comprises the steps of: providing a processor in communication with a main database; receiving from one or more users to the processor a discrete data query associated with one or more manufactured components; providing a semantic query in response to the received discrete data query to a main database such that the semantic query includes a request for the quality testing data in a format for each of a plurality of different statistical display standards, wherein the plurality of different statistical display standards has multiple different statistical computations applied to the stored data; providing data query results to the one or more users responsive to the discrete query such that the data query results include the requested quality testing information associated with the one or more manufactured components from a main database; receiving query adjustments from the one or more users to the processor responsive to the data query results wherein the adjustments are selected from the group comprising product descriptor, defect criteria, time period, assembly, production plant, vendor, and providing adjusted data query results containing the adjustments to the one or more users.

In another aspect the present invention provides a system whereby the receiving of the discrete query is preceded by verifying a username and password associated with the username and wherein the receiving of the discrete query further comprises receiving the discrete query only if the username and password are verified. Each username and password is associated with a level of security clearance, the level of security clearance determining which information can be accessed by the user of the associated username and password; and said providing data query results responsive to the discrete query comprises only data query results of requested data information available at the level of security clearance corresponding to the username and password that are first verified.

A further aspect of the present invention provides a system for managing quality testing activities of one or more manufactured components, the system comprising a processor; a memory connected to the processor, a visual display in communication with the processor, and an input device(s) in communication with the processor, wherein the system is configured to store a quality inspection management information module configured to:
   establish a contract;
   establish quality test limitations;
   create quality testing instructions;
   record quality inspection activity data;
   display quality inspection activity data and outcomes to a plurality of users.

In another aspect the present invention provides a computer readable medium containing the program product to collect, store, analyze and display quality testing of one or more manufactured components data. The computer readable medium comprising instructions for enabling a computer system to perform the following: establishing a contract; establishing quality test limitations; creating quality testing instructions; recording quality inspection activity data; and displaying quality inspection activity data and outcomes to a plurality of users

BRIEF DESCRIPTION OF THE SEVERAL VIEW OF THE DRAWING

FIG. 5A is a screenshot of the "Dashboard" module according to some embodiments of the present invention.

FIG. 5B is a screenshot of a sample contract (work order) authorization process, available within the "Dashboard" module, according to some embodiments of the invention.

FIG. 5C is a screenshot of a sample inspection methodology authorization process, available within the "Dashboard" module, according to some embodiments of the invention.

FIG. 7B is a screenshot of the Element Manager module according to some embodiments of the present invention.

DETAILED DESCRIPTION OF THE INVENTION

Figure 1:
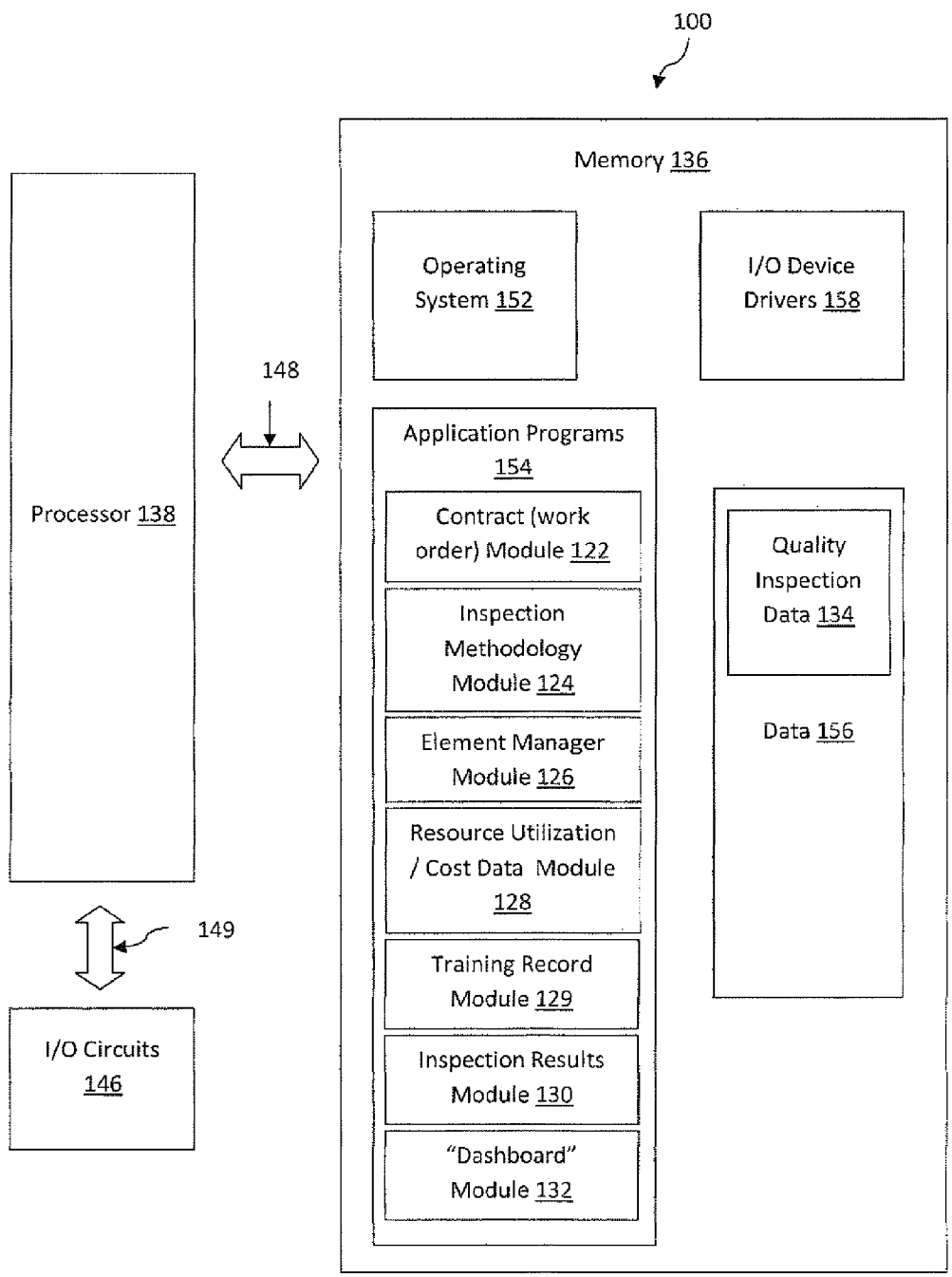
FIG. 1 depicts an exemplary data processing system (Manufacturing Quality Inspection Management System.

The invention now will be described more fully hereinafter with reference to the accompanying drawings, in which illustrative embodiments of the invention are shown. This invention may, however, be embodied in many different forms and should not be construed as limited to the embodiments set forth herein. Like numbers refer to elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "system" or "module." Furthermore, the present invention may take the form of a computer program product on a computer-readable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as Visual Basic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through an Internet using an Application Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 9. As discussed herein, some embodiments of the present invention provide methods, systems and computer program products to manage the process of conducting quality testing activities on manufactured components, and to collect, store, analyze and display quality testing data of manufactured components. As used herein, a "data query" may include any information related to quality testing information of a single manufactured component or group of components.

Referring now to FIG. 1, an exemplary data processing system 100 or Manufacturing Quality Inspection Management System that may be included in devices operating in accordance with some embodiments of the present invention will be discussed. As illustrated, the data processing system 100 includes a processor 138, a memory 136 and input/output circuits 146. The data processing system 100 may be incorporated in, for example, a personal computer, server, router or the like. The processor 138 communicates with the memory 136 via an address/data bus 148 and communicates with the input/output circuits 146 via an address/data bus 149. The input/output circuits 146 can be used to transfer information between the memory 136 and another computer system or a network using, for example, an Internet Protocol (IP) connection. These components may be conventional components such as those used in many conventional data processing systems, which may be configured to operate as described herein.

In particular, the processor 138 can be any commercially available or custom microprocessor, microcontroller, digital signal processor or the like. The memory 136 may include any memory devices containing the software and data used to implement the functionality circuits or modules used in accordance with embodiments of the present invention. The memory 136 may comprise the following types of devices: cache, ROM, PROM, EPROM, EEPROM, flash memory, SRAM, DRAM and magnetic disk.

As further illustrated in FIG. 1, the memory 136 may include several categories of software and data used in the data processing system 100: an operating system 152; application programs 154; input/output device drivers 158; and data 156. As will be appreciated by those of skill in the art, the operating system 152 may be any operating system suitable for use with a data processing system, such as, but not limited to, OS/2, AIX or zOS from International Business Machines Corporation, Armonk, N.Y., Windows2000, WindowsXP, WindowsVista, and Windows7 from Microsoft Corporation, Redmond, Wash., Unix or Linux. The input/output device drivers 158 typically include software routines accessed through the operating system 152 by the application programs 154 to communicate with devices such as the input/output circuits 146 and certain memory components 136. The application programs 154 are illustrative of the programs that implement the various features of the system and modules according to some embodiments of the present invention. Finally, the data 156 represents the static and dynamic data used by the application programs 154, the operating system 152, the input/output device drivers 158, and other software programs that may reside in the memory 136. As illustrated in FIG. 1, the data 156 may include quality inspection test results 134 for use by the circuits and modules of the application programs 154 according to some embodiments of the present invention as discussed further herein.

As used herein, "Quality Inspection Data" 134 may include quality inspection test results, such as inspection methodology data, resource utilization/cost data, training record data, inspection test results, and the like. The quality inspection data 134 may include both discrete data and semantic data without departing from the scope of the present invention.

Referring again to FIG. 1, according to some embodiments of the present invention the application programs 154 include a Contract (work order) module 122, an Inspection Methodology module 124, an "Element" Manager module 126, Resource Utilization/Cost Data module 128, an Inspection Results module 130, and a "Dashboard" module 132.

A Contract is created by the system and presented to a plurality of users in a plurality of mediums by the Contract module. The Contract (work order) module 122 is configured to receive contract (work order) details from an external source, for example, a computing device being operated by a user such as a Dispatch Operator, Quality Inspection Field Staff, and/or the customer. The contract requires the input of quality inspection activity details comprising: customer name and address; location of quality inspection activity; contact personnel and details; product descriptor specified for quality testing including quantity; a brief description of defect criteria to be tested; rates of service (pricing); resources required/authorized to conduct the quality testing activity; and service provision terms and conditions. The Contract (work order) module 122 may be configured to verify the presence of information within a plurality of data input fields before allowing the user to record the contract (work order) to memory 136. The Contract (work order) module 122 is configured to assign a unique identification number to each contract (work order), which will be referenced by data recorded through the Inspection Methodology module 124, the Resource Utilization/Cost Data module 128, the Training Record module 129, the Inspection Results module 130, and the "Dashboard" module 132. In some embodiments of the present invention, the user may be assigned a unique username and password. In these embodiments of the present invention, the Contract (work order) module 122 may be further configured to receive and verify a username and password to execute the contract with an electronic signature, in an electronic medium, on behalf of the user. The unique identification number to each contract will be referenced by all subsequent data received through the system related to that contract. The plurality of mediums comprises an internet-based user interface delivered by an Application Service Provider (ASP); and a computer-printed version of the contract. The user application formats the contract to a size and file-type of common use to facilitate computer printing.

Quality testing instructions are created by the system and presented to a plurality of users in a plurality of mediums by the Inspection Methodolgy module 124. The Inspection Methodology module 124 provides users with open fields and a repository of predefined activity descriptors ("elements") to construct quality testing instructions. The Inspection Methodology module 124 is configured to receive instruction details from an external source, for example a computing device being operated by a user such as Quality Inspection Field Staff, linked to a unique identification number generated by the contract (work order) according to the Contract (work order) module 122. The inspection methodology module 124 is configured to provide the user with an interface to create a series of "Elements" (instruction "steps") and record the process to a memory 136. Elements recorded within the Inspection Methodology module 124 may comprise text, images, illustrations, diagrams and/or video to support the understanding of the inspection methodology. Elements within the inspection methodology module 124 may be re-ordered or arranged by the use of input/output circuits 146 to amend the sequential methodology process. The Inspection Methodology module 124 may be configured to provide users with pre-defined Elements recorded to memory 136 to construct a quality inspection methodology, which may comprise text, images, illustrations, diagrams and/or video. Embodiments of the present invention may be configured to allow newly created Elements and pre-defined Elements to be identified as a "Risk". In these embodiments of the invention, the "Risk" may be configured to distribute an automated email to a plurality of contacts identifying the use of an Element identified as a "Risk". The Inspection Methodology module 124 is configured to allow inspection methodologies to be recorded for review, and may be configured to receive and verify a username and password to "approve" the quality inspection methodology as presented with an electronic signature, in an electronic medium, on behalf of the user. The Inspection Methodology module 124 is configured to assign a unique revision identification number to any quality inspection methodology that is amended or changed.

Some embodiments of the present invention may include an Element Manager module 126 configured to receive data from an external source, for example, a computing device being operated by a user such as a Dispatch Operator, Quality Inspection Field Staff, and/or Field Staff Manager. Data received through the Element Manager module 126 is recorded to memory 136 comprising a plurality of elements of a plurality of location/customer specific notifications related to the delivery of quality testing activity at that location and a plurality of user warnings to highlight potential hazards in the quality testing process. The Element Manager module 126 may be configured to allow users to record a series of pre-defined Elements useful to users, such as Quality Inspection Field Staff, creating inspection methodologies through the Inspection Methodology module 124. The Element Manager module 126 provides an interface for users to create, record, and categorize Elements comprising text, images, illustrations, diagrams and/or video. Pre-defined Elements may be accessed and incorporated by users in the course of creating instruction methodologies through the Inspection Methodology module 124. For example, an effective medium to communicate the process of identifying an acceptable weld seam may be through the display of a series of images and text depicting/describing a variety of weld seam defects, such as porosity, blow-through, cracking, and undercutting. The Element Manager module 126 may be configured to record a series of images and descriptions illustrating key indicators of such weld seam defects to memory 136. Quality Inspection Field Staff creating an inspection methodology through the Inspection Methodology module 124 may retrieve these pre-defined Elements, including the images and descriptions and incorporate the pre-defined Elements into the specific inspection methodology. Certain embodiments of the present invention may be configured to receive and verify a username and password before the user may add, amend, and/or delete pre-defined Elements from the Element Manager module 126.

The Resource Utilization/Cost Data module 128 may be configured to receive a plurality of data relating to costs associated with the provision of a specific quality inspection activity, comprising of a time and attendance log, a transportation log, a supplies inventory, and a general expense interface, from an external source, for example, a computing device being operated by a user such as Quality Inspection Field Staff. Cost data recorded to the Resource Utilization/Cost Data module 128 is linked to the unique identification number of the respective contract (work order) generated by the contract (work order) module 122. Users may generate exports of the data recorded within the Resource Utilization/Cost Data module 128 formatted in a plurality of designs for integration with external accounting software or invoicing systems. It is understood that the current invention may be configured to allow a plurality of data modifiers on data exports without departing from the scope of the present invention.

The Training Record module 129 is configured to receive Quality Inspection Field Staff training and validation methods data from an external source, for example, a computing device being operated by a user such as a Quality Inspection Field Staff. Data inputted and recorded through the Training Record module 129 is linked to a unique identification number of the respective contract (work order) generated by the contract (work order) module 122 and recorded to memory 136. Users may generate exports of the data recorded within the Training Record module 129 formatted in a plurality of designs to provide Field Staff Management reports comprising of data such as name, date/time duration, method/approach, frequency of training, revision identification number of respective inspection methodology. It is understood that the current invention may be configured to allow a plurality of data modifiers on data exports without departing from the scope of the present invention.

The Inspection Results module 130 is configured to receive quality inspection activity results data from an external source, for example, a computing device being operated by a user such as a Quality Inspection Field Staff. Data inputted and recorded through the Inspection Results module 130 is linked to a unique identification number of the respective contract (work order) generated by the contract (work order) module 122 and recorded to memory 136. Users may generate exports of the data recorded within the Inspection Results module 130 formatted in a plurality of designs to meet statistical presentation standards consistent with quality inspection data. For example, a data query may request quality inspection data specific to contract (work order) number. The query may be defined to select quality inspection data related to specific part number over a specified date/time period, compute total test failure data for specified test. Test failure data will be computed to a standardized presentation formula of "Parts-per-Million" (PPM) failures, and all test criteria data presented within a Pareto chart. It is understood that the current invention may be configured to allow a plurality of data modifiers on data exports without departing from the scope of the present invention.

The "Dashboard" module 132 is configured to receive data queries from an external source, for example, a computing device being operated by a user such as a customer, Quality Inspection Field Staff, Field Staff Manager, and/or other stakeholders. The system provides interface whereby the plurality of contract, quality test instructions, test data, and resources, are presented in a consolidated "dashboard" for a plurality of users to access, review, and approve. In some embodiments of the present invention, the user may be assigned a unique username and password. In these embodiments of the present invention, the "Dashboard" module 132 may be further configured to verify the user name and password before the user is allowed to make a data query. In some embodiments of the present invention, the username and password may be associated with a level of security clearance. Thus, each user name and password may define what records a user making a data query can access, limiting access to confidential information. In some embodiments of the present invention, the security feature may be used to restrict user access to data contingent upon product ownership, inspection activity site location, and/or manufacturing processes. Thus, customer's private information can be kept confidential from other users of the "Dashboard" module 132.

The "Dashboard" module 132 is configured to obtain the results provided by the data query from memory 136 and format the results in a user friendly format. The query results may comprise any quality inspection data 134, created or recorded through the Contract (work order) module 122, Inspection Methodology module 124, the Element Manager module 126, the Resource Utilization/Cost Data module 128, and/or the inspection results module 130. Export and display formats of the plurality of quality inspection data may take a variety of forms, be subject to data modifiers occurring before or after display, or be made available in a plurality of mediums without departing from the scope of the present invention.

While the present invention is illustrated with reference to the Contract (work order) module 122, the Inspection Methodology module 124, the Element Manager module 126, the Resource Utilization/Cost Data module 128, Training Record module 129, an inspection results module 130, and a "Dashboard" module 132 being application programs in FIG. 1, as will be appreciated by those of skill in the art, other configurations fall within the scope of the present invention. For example, rather than being application programs 154, these modules may also be incorporated into the operating system 152 or other such logical division of the data processing system 100. Furthermore, while the Contract (work order) module 122, the Inspection Methodology module 124, the Element Manager module 126, the Resource Utilization/Cost Data module 128, Training Record module 129, the Inspection Results module 130, and the "Dashboard" module 132 are illustrated in a single data processing system, as will be appreciated by those of skill in the art, such functionality may be distributed across one or more data processing systems. Thus, the present invention should not be construed as limited to the configuration illustrated in FIG. 1, but may be provided by other arrangements and/or divisions of functions between data processing systems. For example, although FIG. 1 is illustrated as having various circuits/modules, one or more of these circuits may be combined without departing from the scope of the present invention.

Figure 2:
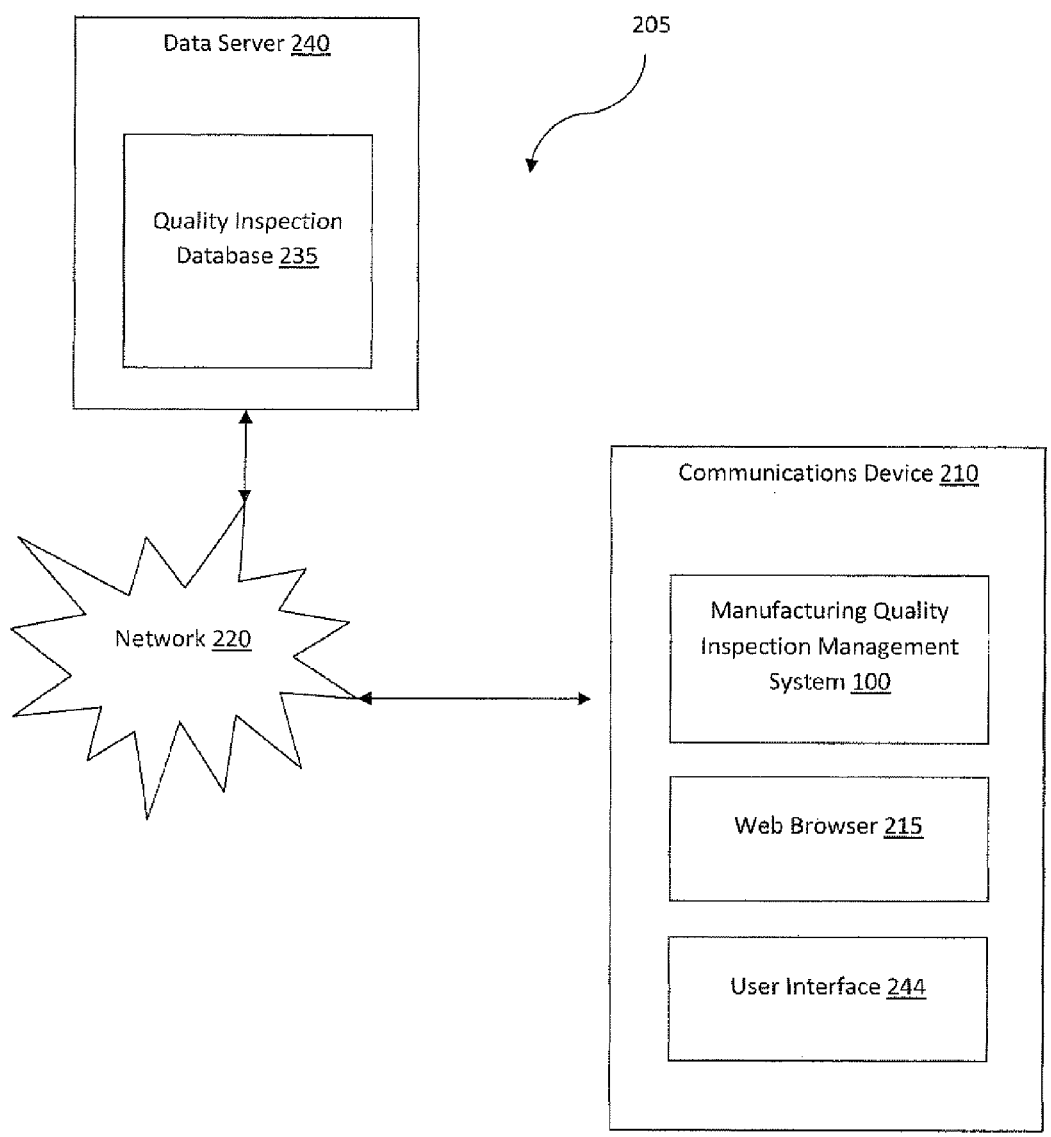
FIG. 2 depicts an exemplary environment for operations and devices according to some embodiments of the present invention.

Referring now to FIG. 2, an exemplary environment 205 for operations and devices according to some embodiments of the present invention will be discussed. As illustrated in FIG. 2, the environment 205 may include a communications device 210, a network 220, and a data server 240. As illustrated, the communications device 210 illustrated in FIG. 2 may include the Manufacturing Quality Inspection Management System 100 according to some embodiments of the present invention discussed above with respect to FIG. 1. For example, the application programs 154 discussed with respect to FIG. 1 could be included as part of the Manufacturing Quality Inspection Management System 100 of the communications device 210. The communications device 210 may be, for example, a laptop computer, a desktop computer, a personal data assistant (PDA), a web capable mobile terminal or any device capable of communicating with the network 220. The communications device 210 may include a user interface 244, which may be used to enter data queries or record quality inspection data according to some embodiments of the present invention, a web browser 215 that may be accessed through the user interface 244, and a Manufacturing Quality Inspection Management System 100 according to some embodiments of the present invention. The data server 240 may include a Quality Inspection Database 235, which may comprise inspection results, inspection methodologies, resource utilization/cost data, training record data, and contracts (work orders) as discussed above with respect to FIG. 1. The communications device 210 may communicate over the network 220, for example, an Internet, through a telephone line, a digital subscriber link (DSL), a broadband cable link, a wireless link or the like. The data server 240 may also communicate over the network 220. Thus, the network 220 may convey data between the communications device 210 and the data server 240.

It will be understood that although only a single Quality inspection database 235 is illustrated in FIG. 2, embodiments of the present invention are not limited to this configuration. For example, multiple Quality Inspection databases can be included in the environment 205 without departing from the scope of the present invention.

Figure 3:
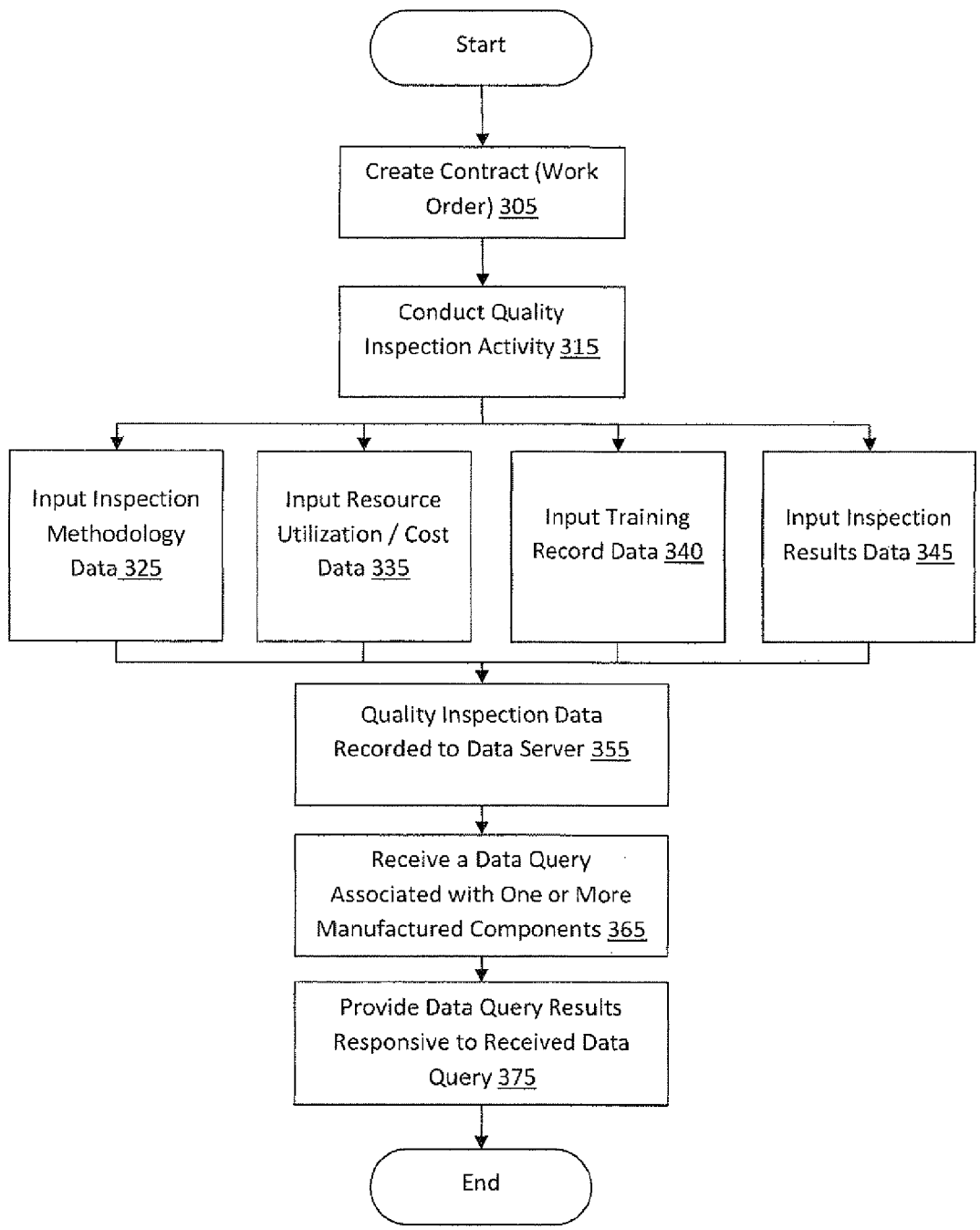
FIG. 3 is a flowchart of operations incorporating the use of the data processing system according to the present invention.

Referring now to the invention in more detail, in FIG. 3 there is an operations flow according to various embodiments of the present invention. More specifically, a quality inspection activity initiates the operations flow, beginning with the creation of contract (work order) 305 through the use of an application program Manufacturing Quality Inspection Management System 100 as presented in FIG. 1. Quality Inspections Field Staff conduct the quality inspection activity 315 and input a plurality of data comprising of inspection methodology 325, resource utilization/cost data 335, training record data 340, and inspection results 345 via modules of the data processing system 100 as exemplified in the present invention and detailed in FIG. 1. Quality Inspection Data is recorded to a data server 355. A plurality of users, including Quality Inspection Field Staff, Field Staff Managers, customers, and various other stakeholders, may submit a data query 365 associated with a single manufactured component or a group of manufactured components via an interface capable of operating the Data Processing System according to various embodiments of the present invention. The system applies arithmetic calculations to consolidate and convert quality test data into statistical results delineated by a plurality of user defined criteria selected from the group consisting of product descriptor; defect criteria; time period; assembly process; production plant; vendor; and assembler. The data query can be, for example, a data report listing all test failures of a specific component between dates X and Y. The query results may be formatted to include presentation of the data subject to specific statistical process control presentation standards (such as "parts-per-million" computations, Pareto charting, trend analysis, etcetera). The query results may be configured or modified to display additional details of the various causes of the test failures, or a sub-selection of test failure causes. Query results may be exported electronically by a plurality of users in various formats for integration with external software systems such as accounting/invoicing programs, statistical analysis programs, presentation software, computer printingand payroll applications. It will be understood that the data query may produce quality inspection data in a plurality of mediums and formats according to the embodiments of the present invention.

Figure 4:
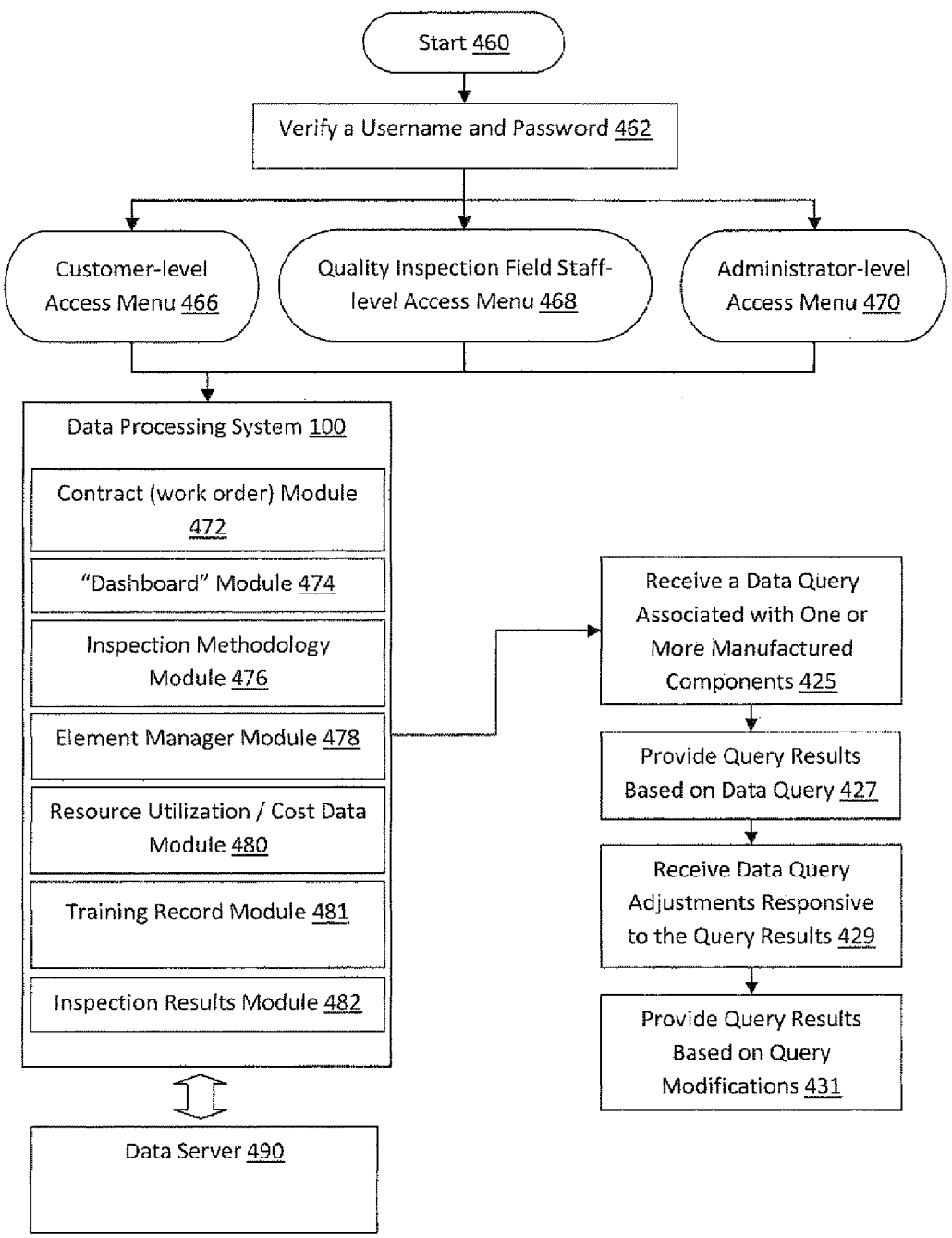
FIG. 4 is a flowchart of operations for the data processing system according to the present invention.

Referring now to the invention in more detail in FIG. 4, operations begin at block 462 by verifying a user name and password. Each user, for example, customer, Quality Inspection Field Staff, or Field Staff Manager, may have a unique user name and level of security clearance. The level of security clearance may determine which information can be accessed by the user of the associated user name and password. Where embodiments of the present invention are so configured, customer-level security clearance will provide access to the "Dashboard" module 474; Quality Inspection Field Staff-level clearance will provide access to the Inspection Methodology module 476, Resource Utilization/Cost Data module 480, Training Record Module 481, and the Inspection Results Module 482; Administrator-level clearance will provide access to all modules of the Data Processing System 100—Contract (work order) module 472, "Dashboard" module 474, Inspection Methodology module 476, Element Manager module 478, Resource Utilization/Cost Data module 480, Training Record module 481, and the Inspection Results Module 482.

Customer-level security clearance may access "Dashboard" module 474, where users may submit data queries associated with the inspection activities related to one or more manufactured component(s) 425, as restricted to the security clearance associated with the user name and password. Quality inspection data available may comprise of contracts (work orders), inspection methodologies, resource utilization/cost data, and inspection results. Data queries are submitted to Data Server 490 and returned (block 427). Quality inspection data displayed in response to data query 425 may be presented in a plurality of formats. "Dashboard" module 474 provides query results for review and electronic export by the user. Query adjustments 431 may be received from the user responsive to the query results provided 429. In these embodiments of the present invention, the "Dashboard" module 474 may be further configured to receive and verify a username and password to submit/approve/authorize documents comprising the contract (work order) and the inspection methodology with an electronic signature, in an electronic medium, on behalf of the user. The system provides for unique electronic signature established by a plurality of users upon their first instance of access to the internet based user interface.

Quality Inspection Field Staff-level security access may access Inspection Methodology module 476, Resource Utilization/Cost Data module 480, Training Record module 481, and the Inspection Results Module 482. According to the preferred embodiment of the present invention, Inspection Methodology module 476 provides the user with an interface to create instruction details consisting of sequential Elements, which may comprise text, images, illustrations, diagrams and/or video, to support the understanding of the inspection methodology. Resource Utilization/Cost Data module 480 provides the user with an interface to record time and attendance data, travel logs and general entry fields to record resources utilized to complete a quality inspection activity. The Training Record module 481 provides an interface to allow users to record Quality Inspection Field Staff training and validation methods data comprising of name, date/time duration, method/approach, frequency of training, revision identification number of respective inspection methodology. Inspection Results module 482 provides the user with an interface to record quality inspection test results for one or more manufactured component(s). Data input to Inspection Methodology module 476, Resource Utilization/Cost Data module 480, Training Record module 481, and the Inspection Results Module 482 are recorded to Data server 490. Data queries 425 submitted by Quality Inspection Field Staff-level users are displayed (block 427) through Data Processing System 100.

Administrator-level clearance will provide access to all modules of the Data Processing System 100—Contract (work order) module 472, "Dashboard" module 474, Inspection Methodology module 476, Element Manager module 478, Resource Utilization/Cost Data module 480, Training Record module 481, and the Inspection Results Module 482. In addition to the interfaces "Dashboard" module 474 Inspection Methodology module 476, Resource Utilization/Cost Data module 480, and the Inspection Results Module 482 described above, Administrator-level access includes interfaces to create contracts (work orders) and manage Elements.

Figure 5A:
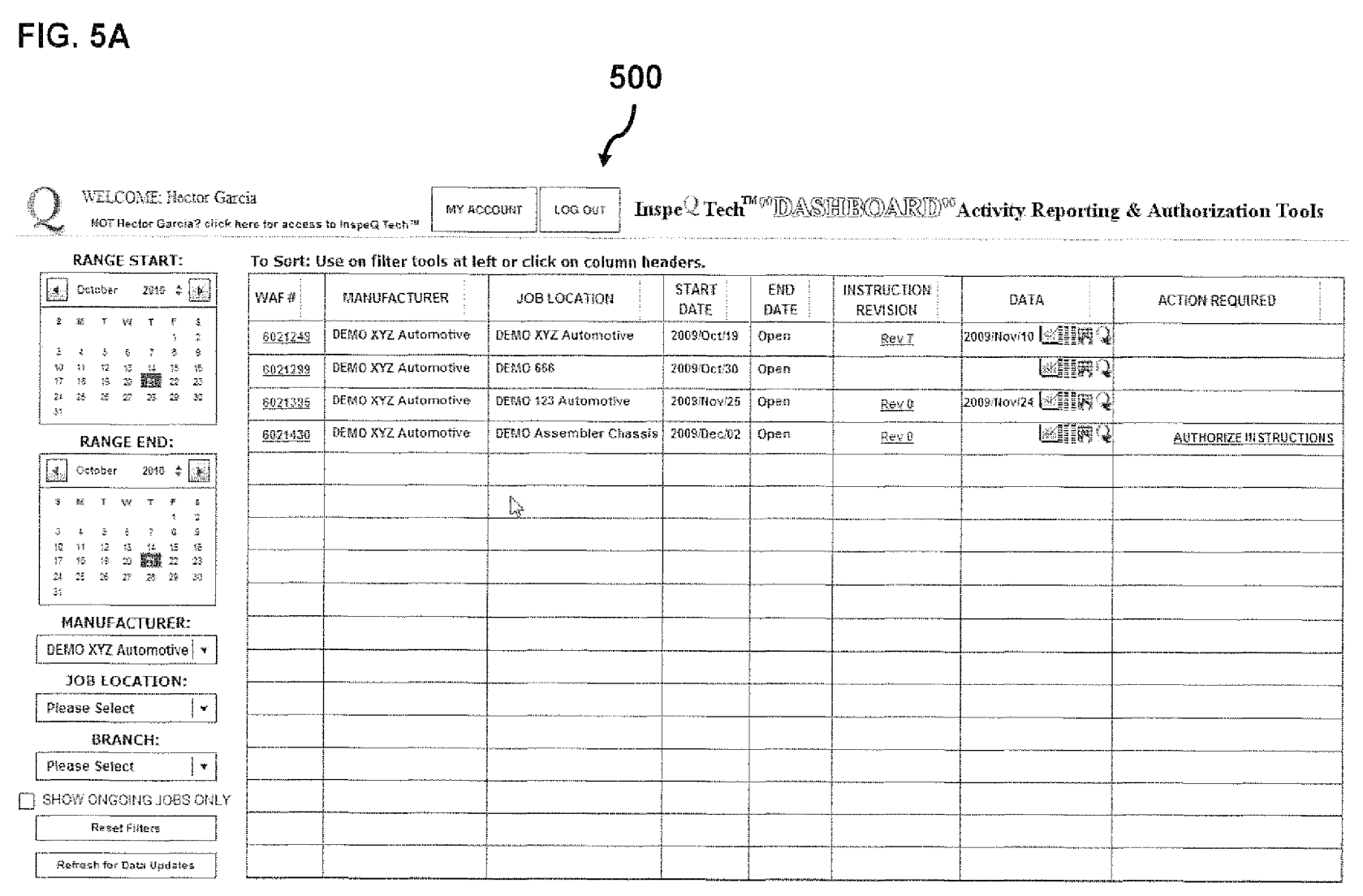

FIG. 5A is a screenshot illustrating a representative "Dashboard" module window 500 according to one embodiment of the present invention. A user can interact with the "Dashboard" module window 500 to submit data queries, display a plurality of quality inspection data as formatted reports, and the "Dashboard" module 500 may be further configured to receive and verify a username and password to submit/approve/authorize documents comprising the contract (work order) and the inspection methodology with an electronic signature, in an electronic medium, on behalf of the user. Using "Dashboard" module window 500, quality inspection data such as the contract (work order), manufacturer, quality inspection activity location, quality inspection start date, quality inspection end data, quality test instruction methodology (and previous revisions), and inspection results may be displayed/printed/exported in a plurality of formats. Further "Dashboard" module window 500 allows users to modify data displayed by quality inspection start date, quality inspection end date, manufacturer, quality inspection activity location, branch, and whether the quality inspection activity in ongoing. Data displayed may similarly be re-ordered by any of the above described categories.

Figure 5B:
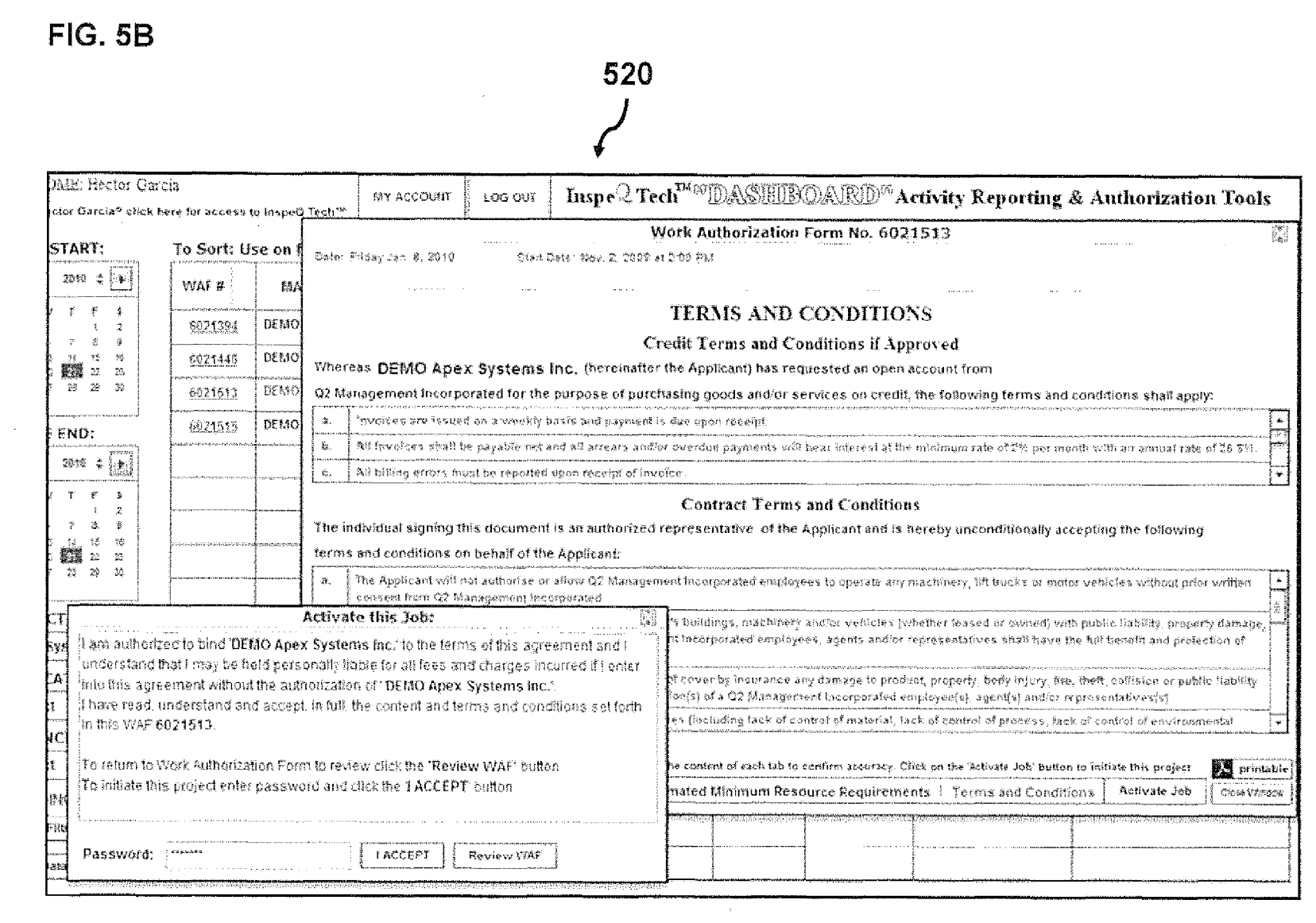

FIG. 5B is a screenshot illustrating a representative document submission/approval/authorization action conducted as an operation of the "Dashboard" module 500. A user can interact with "Dashboard" module authorization window 520 to display/print/export contract (work order) data. The "Dashboard" module authorization window 520 can correspond to the "Dashboard" module 500 after current quality inspection data is acquired from the primary data server. According to some embodiments of the present invention, "Dashboard" module authorization window 520 may be configured to receive and verify a username and password to submit/approve/authorize contracts (work orders) with an electronic signature may be applied by a plurality of users via an internet based user interface to execute the contract.

Figure 5C:
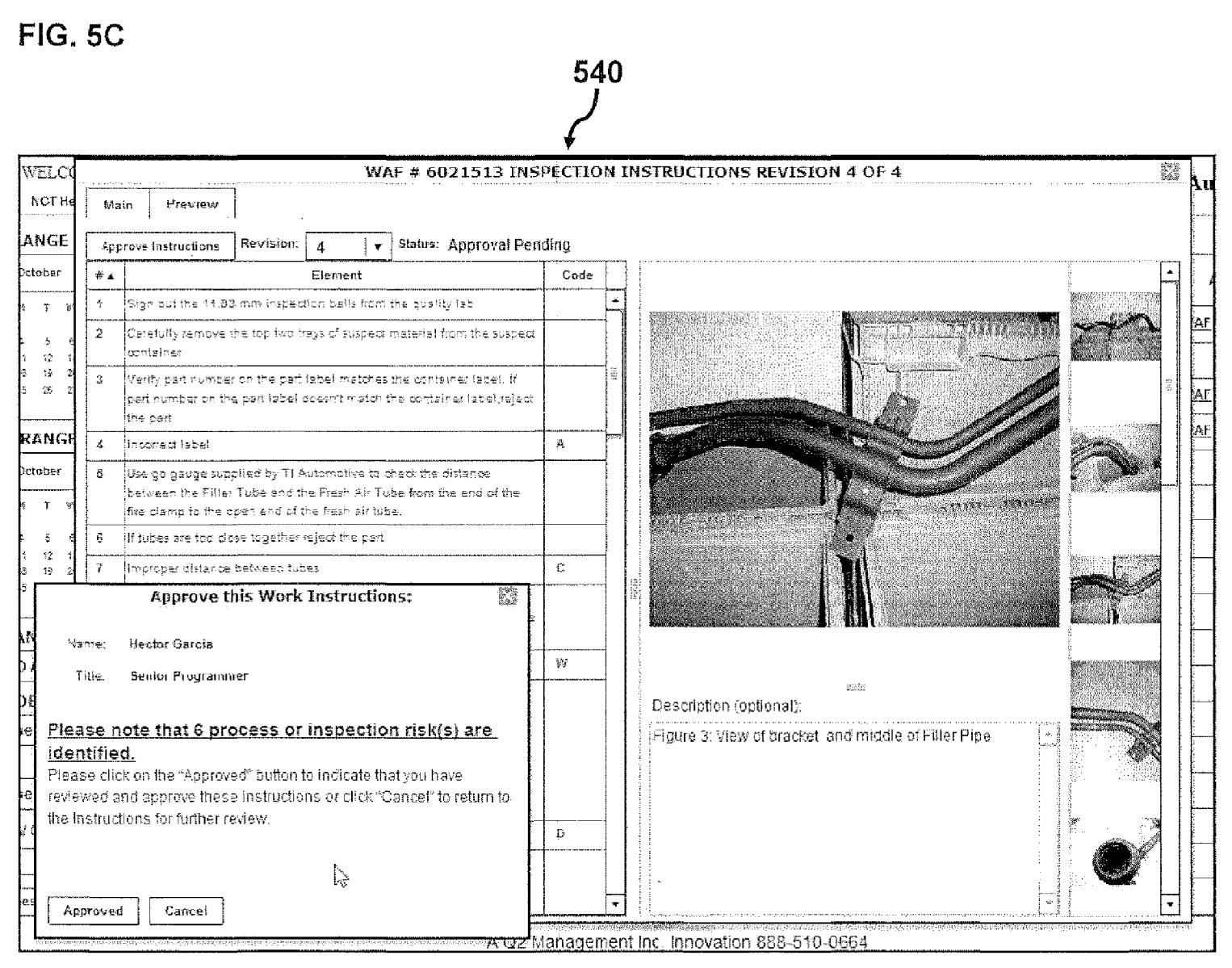

FIG. 5C is a screenshot illustrating a representative document submission/approval/authorization action conducted as an operation of the "Dashboard" module 500. A user can interact with "Dashboard" module authorization window 520 to display/print/export inspection methodology data. The "Dashboard" module authorization window 520 can correspond to the "Dashboard" module 500 after current quality inspection data is acquired from the primary data server. According to some embodiments of the present invention, "Dashboard" module authorization window 520 may be configured to receive and verify a username and password to submit/approve/authorize inspection methodologies with an electronic signature.

Figure 6A:
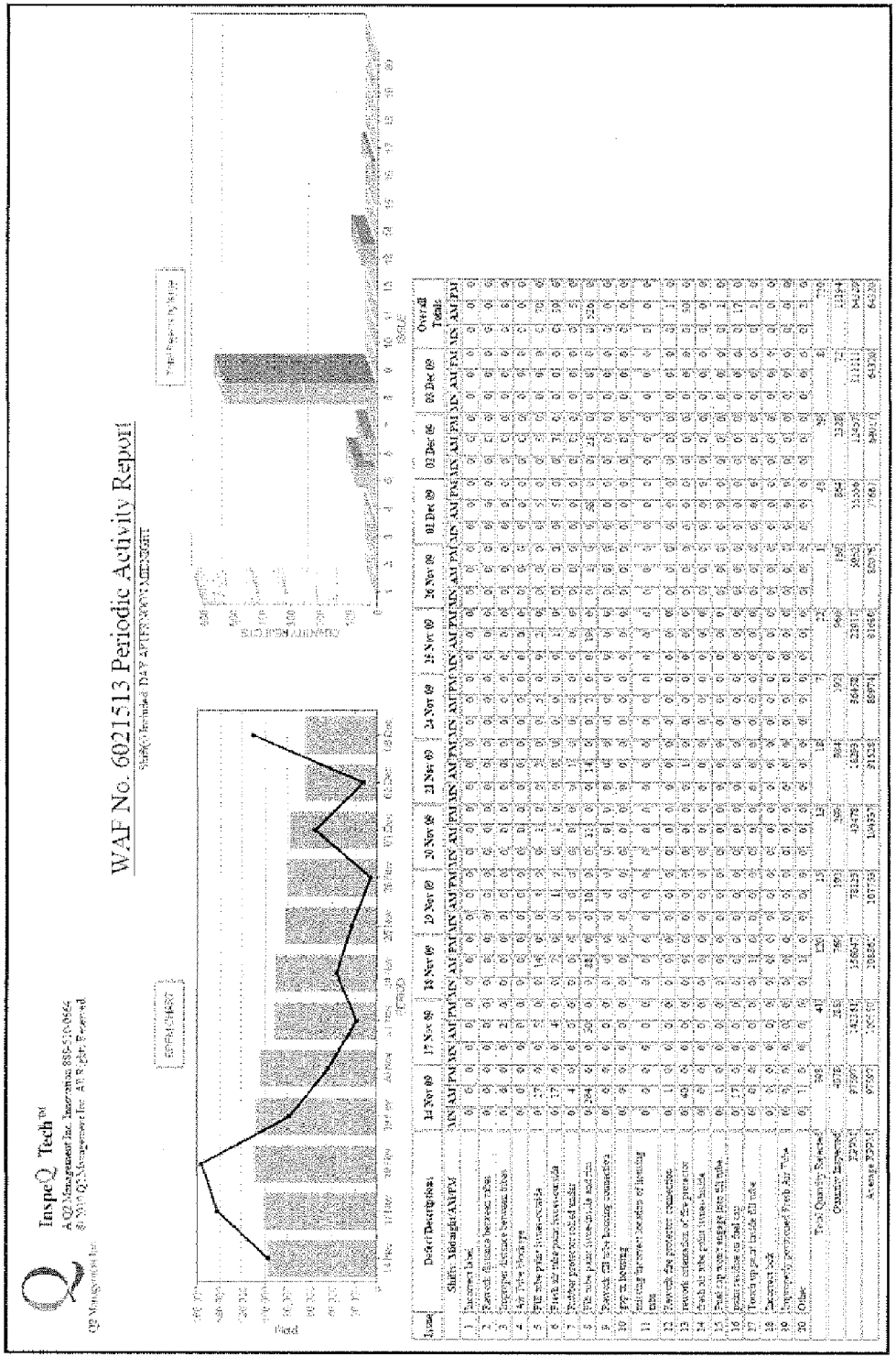
FIG. 6A is a sample of quality inspection test results data according to some embodiments of the present invention.

FIG. 6A is a screenshot illustrating a sample inspection results report 600 according to one embodiment of the invention. As described in FIG. 5A, a user can interact with "Dashboard" module 500 to submit data queries regarding one or more manufactured component(s). Sample inspection results report 600 displays a tabular, graphical and computed representation of a plurality of quality inspection data returned by the query. The sample details quality inspection test result figures comprising of total quantity inspected, total rejected, test failure figures segregated by category, and a computed Rejected Parts per Million figure. Graphically, inspection test data is represented in both a summary and chronological chart format.

Figure 6B:
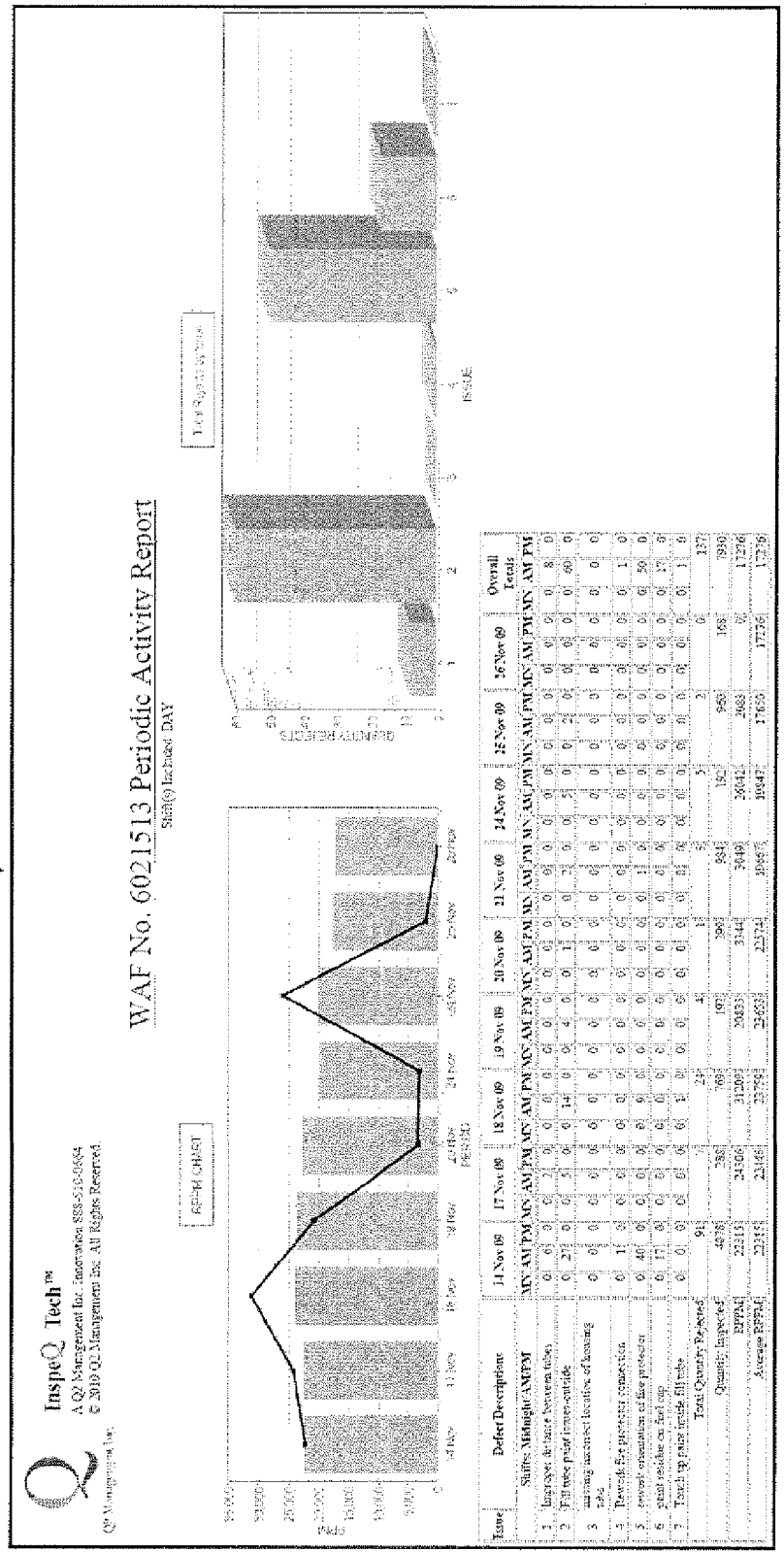
FIG. 6B is a sample of quality inspection test results data, modified by user-defined criteria, according to some embodiments of the present invention.

FIG. 6B is a is a screenshot illustrating a sample inspection results report 620 according to one embodiment of the invention. The sample inspection results report 620 is a modified data display of the example illustrated in FIG. 6A, amending a variety of user-defined criteria through interaction with the "Dashboard" module 500.

Figure 7A:
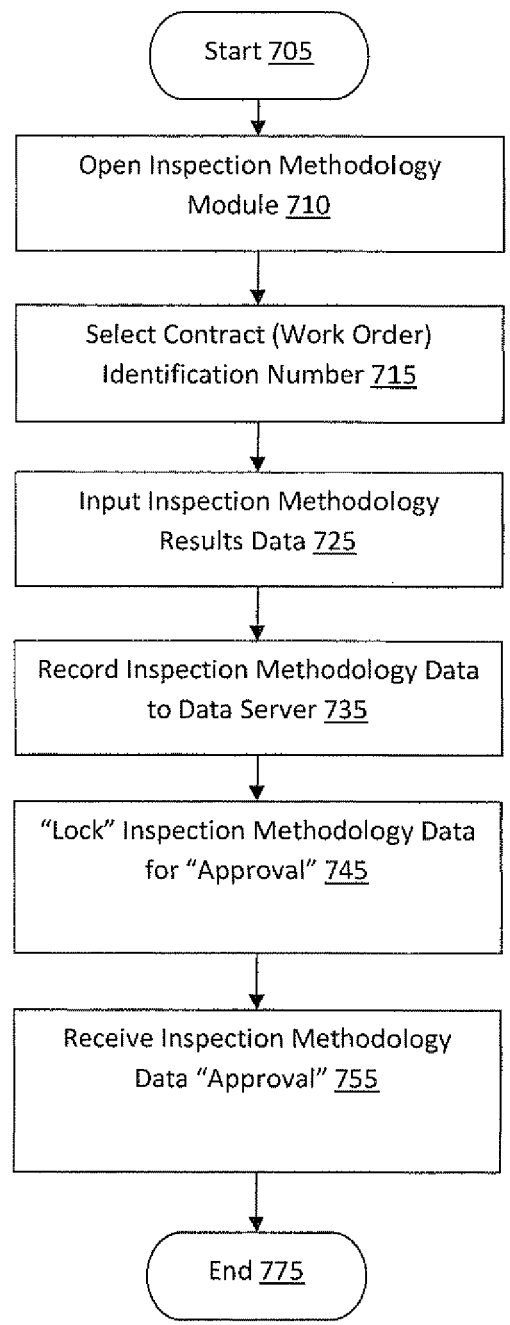
FIG. 7A is a flowchart illustrating operations of the Inspection Methodology module according to some embodiments of the present invention.

Referring now to an embodiment of the present invention, FIG. 7A depicts a flowchart for the operation of Inspection Methodology module 124 as described in FIG. 1. The purpose of this routine, which begins at block 705, is to prepare, review, revise, organize and approve processes or direction required to conduct quality inspection test activity. Users access the Inspection Methodology module 710 of Data Processing System 100. Users may select an available contract (work order) 715 from a tabular display of those contracts (work orders) available to the security clearance assigned to the username and password. An interface is available to allow the user to input a quality inspection instruction methodology 725, comprising a sequence of Elements as described in FIG. 1. Elements may comprise text, images, illustrations, diagrams and/or video to support the understanding of the inspection methodology. Where embodiments of the present invention are so configured, users may utilize a series of pre-defined Elements to create the inspection methodology. Pre-defined Elements may comprise text, images, illustrations, diagrams and/or video. Users may assign each Element a unique "reject code" to categorize and classify individual test criteria. According to some embodiments of the present invention, data input may be recorded to a local memory for transmission to an external data server at a later time, or data input may be recorded directly to an external data server 735 through a local area network (LAN) a wide area network (WAN), or a connection made to an external computer (for example, through an Internet using an Application Service Provider). Embodiments of the present invention may be configured to allow newly created Elements and pre-defined Elements to be identified as a "Risk". In these embodiments of the invention, the "Risk" may be configured to distribute an automated email to a plurality of contacts identifying the use of an Element identified as a "Risk". Users may "lock" an inspection methodology 745 for review by a customer or Field Staff Manager. The inspection methodology module 710 may be configured to receive and verify a username and password to "approve" the quality inspection methodology as presented 755, in an electronic medium with an electronic signature, on behalf of the user.

FIG. 7B is a screenshot illustrating the Element Manager module 790 according to one embodiment of the present invention. The Element Manager module allows users with appropriate security clearance to create, amend, and/or delete comprising a plurality of elements of a plurality of location/customer specific notifications related to the delivery of quality testing activity at that location and a plurality of user warnings to highlight potential hazards in the quality testing process in pre-defined Elements. Pre-defined Elements may comprise text, images, illustrations, diagrams and/or video. Pre-defined Elements present users of Inspection Methodology module 710 (FIG. 7) with pre-written, Manager-approved instruction "steps" to incorporate into inspection methodologies. Pre-defined Elements may contain "Risks" highlighting inspection actions which contain heightened opportunities for the quality inspection process to fail. The system provides for selected "Risk" elements to require a plurality of users to approve the specific "Risk" through a user interface. Further, the system provides for elements selected as Risk to automatically generate an email transmission to notify a plurality of users of the selected Risk. Pre-defined Elements may be categorized in a plurality of segments to assist users in quickly locating appropriate pre-defined Elements.

Figure 7C:
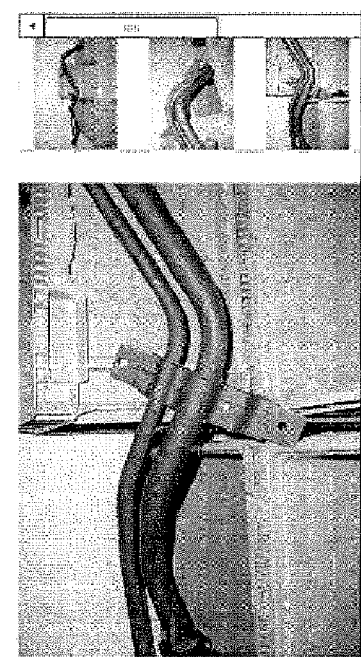
FIG. 7C is a screenshot of the Inspection Methodology module according to some embodiments of the present invention.

FIG. 7C is a screenshot illustrating a representative Instruction Methodology module window 795 according to one embodiment of the present invention. A user can interact with the Instruction Methodology module window 795 to create (upload/store), amend, and/or delete Elements (instruction "steps") in the process of creating quality test instructions; a sequential quality inspection methodology. Elements may comprise text, images, illustrations, diagrams and/or video to support the understanding of the inspection methodology. The system provides for users to select and assign unique and non-repeating reject codes to specific elements in the quality test instructions whereby the system reviews previously assigned reject codes with current and historic revision levels of the quality test instructions to preclude duplication in assigning a reject code. In some embodiments of the present invention, the Instruction Methodology module window 795 can correspond to the primary data server to allow selection of pre-defined Elements as described in FIG. 7B. Users may interact with the Instruction Methodology module window 795 to store and "Lock", quality test instructions or amend/revise existing quality test instructions for a plurality of users to "Approve" with an electronic signature. The system provides for revised quality test instructions to be assigned sequential revisions numbers as well as storage of current and historic revision levels for subsequent recall/review by a plurality of users.

Figure 8:
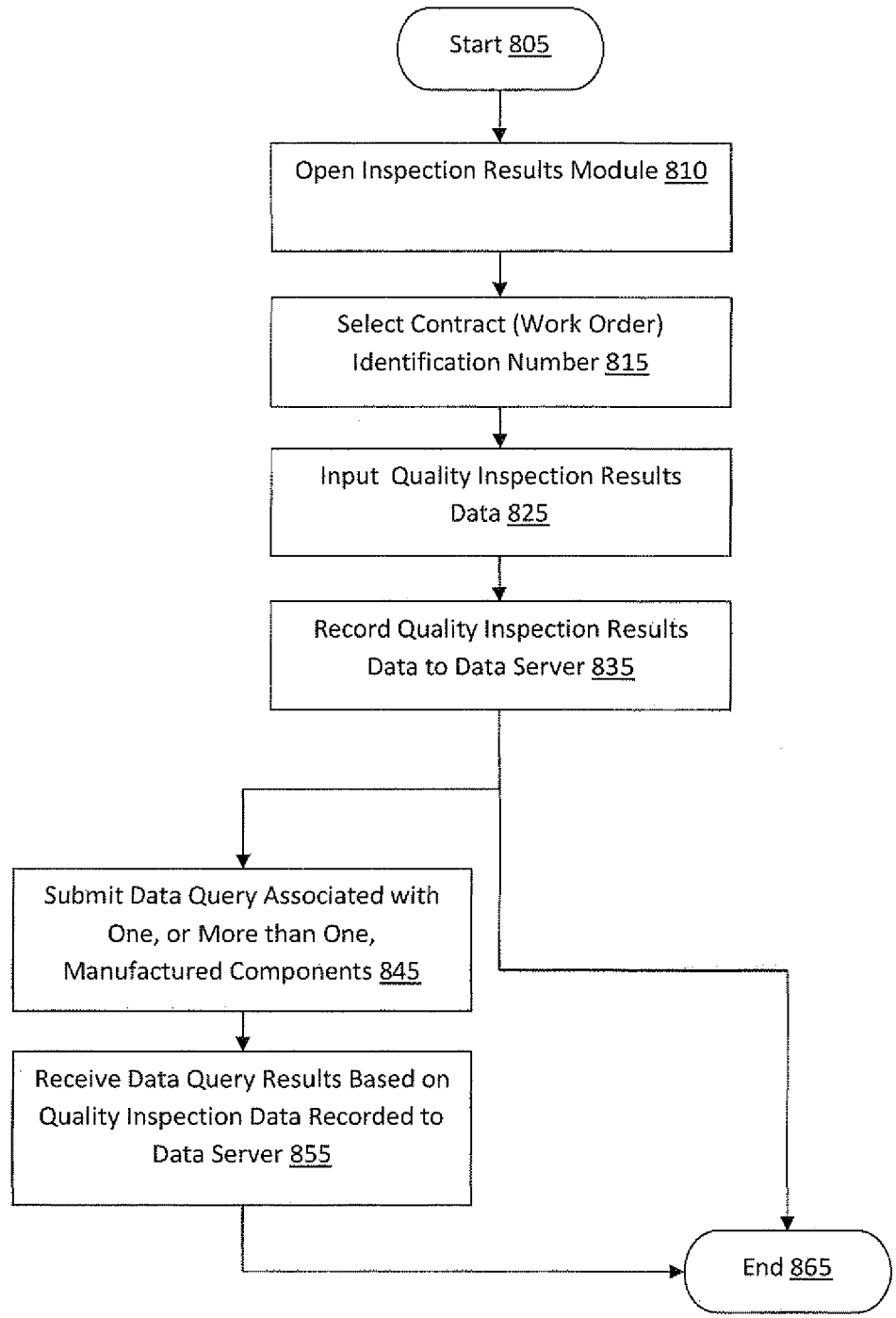
FIG. 8 is a flowchart of the Inspection Results module according to the present invention.

Referring now to FIG. 8 is a flow diagram for recording quality inspection test results data. Operations begin at block 805 according to some embodiments of the present invention. Users access the Inspection Results Module 810 of Data Processing System 100. Users may select an available contract (work order) 815 from a tabular display of those contracts (work orders) available to the security clearance assigned to the username and password. An interface may be utilized to input a plurality of quality inspection test results data 825, comprising date of quality inspection, shift of quality inspection, Quality Inspection Field Staff conducting the quality inspection, total quantity inspected, quantities rejected delineated by each test criteria, and/or notes on specific test rejections. According to some embodiments of the present invention, data input may be recorded to a local memory for transmission to an external data server at a later time, or data input may be recorded directly to an external data server 835 through a local area network (LAN) a wide area network (WAN), or a connection made to an external computer (for example, through an Internet using an Application Service Provider). The user may complete the operation at this point 865 or submit a quality inspection data query 845 for display 855 and analysis. Quality inspection data results may be displayed/printed/exported as described in FIG. 6A.

Figure 9:
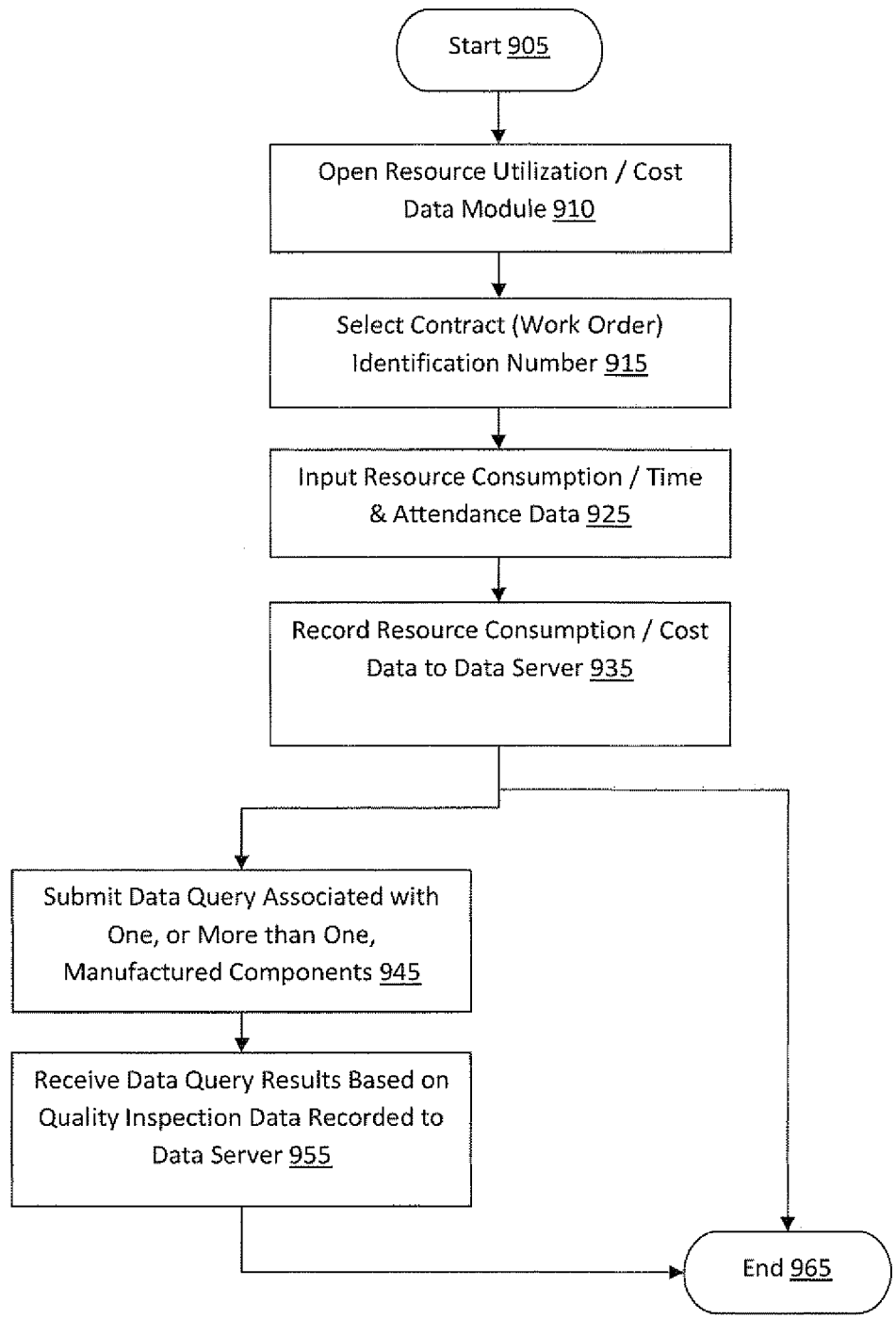
FIG. 9 is a flowchart of the Resource Utilization/Cost Data module according to the present invention.

Referring now to FIG. 9 is a flow diagram of recording resource utilization/cost data. Operations begin at block 905 according to some embodiments of the present invention. Users access the Resource Utilization/Cost Data module 910 of Data Processing System 100. Users may select an available contract (work order) 915 from a tabular display of those contracts (work orders) available to the security clearance assigned to the username and password. An interface may be utilized to input a plurality of resource data 925, comprising time and attendance data, a transportation log, a supplies inventory, and a general expense interface. According to some embodiments of the present invention, data input may be recorded to a local memory for transmission to an external data server at a later time, or data input may be recorded directly to an external data server 935 through a local area network (LAN) a wide area network (WAN), or a connection made to an external computer (for example, through an Internet using an Application Service Provider). The user may complete the operation at this point 965 or submit a quality inspection data query 945 for further analysis 955. Resource utilization/cost data may be displayed/printed/exported in a plurality of formats for integration to external software applications such as accounting systems, time and attendance software, and/or invoicing software.

The features of this invention provides the following advantages to users:

Ground-breaking approach to support Quality Inspections service delivery for the manufacturing industry Allows users (internal and external) real-time global access to inspection specifications, activities, results and statistical data, as opposed to industry norm of 24-72 hours. quality inspection data are critical to "Just in Time" manufacturing as they impact build schedules, shipment requirements, and resource utilization Empowers distant suppliers to take responsibility for quality challenges off-site and take corrective measures in their internal manufacturing processes immediately. The live activity/data information eliminates the inherent delays associated with voice/email communications that are exasperated with time zone and physical availability challenges.

Improves supply-chain productivity and accountability as it allows the supplier to manage the inspection process and results directly regardless of the geographic distance. This eliminates the need for the recipient of suspect materials to allocate time and staff managing quality issues caused by their suppliers. This can effectively allow supply chain stakeholders to re-allocate the position of "incoming quality coordinator", often a position dedicated to managing quality issues caused by suppliers. In a lean-manufacturing environment such as the automotive industry this represents a significant resource improvement.

Contracts are issued, authorized and executed online, reducing delays and communication challenges Online activation triggers an automated notification system to relevant Field staff, providing site specific requirements such as health and safety policies of the plant, customer requests, communication protocols, tooling limitations, etc. Essentially eliminating customer complaints of this nature. Reduces service response times. Improving response time is a critical service attribute in a "Just in Time" manufacturing environment Improved service execution as activity occurring at any geographic location may be monitored in real-time by a Supervisor or Manager. This feature allows for immediate collaboration and content-rich evaluation by highly-skilled, but distant internal/external experts. Customers enjoy a far more sophisticated level of service delivered by less sophisticated (less expensive) but effectively managed Field Staff.

Improved data entry/processing as Field Staff now enter data related to quality projects including activity outcomes and time and material billing directly into the data base. Thereby eliminating errors and omissions characteristic of translating data from manual documents to electronic format by back office staff.

Facilitates enterprise wide learning and growth with a knowledge repository, instantly transferring innovation across the entire organization unrestricted by geography or functional role.

Providing a dashboard of management reports related to metrics tracking operational and functional effectiveness and efficiencies.

Reduces training cycle for Field Supervisors Staff as well as reducing the management resources to develop and mentor Field Supervisors allowing technical managers to simultaneously mentor multiple Field Supervisor trainees from a distance.

Improves supplier management by providing vendors with detailed consumption information.

Supplier bill errors reduced by up to 100%

Invoicing cycle reduced maintaining error-free processes, shortening cash cycle and increasing administrative capacity/productivity.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above embodiment, method, and examples, but by all embodiments and methods within the scope and spirit of the invention as claimed.

What is claimed is:

1. A method to accumulate and distribute quality assurance testing data across a multi-tiered manufacturing supply chain wherein components and assemblies are manufactured at different levels in the supply chain, the method comprising:
(a) providing a main processor coupled to multiple memory devices containing multiple databases, wherein the main processor is configured to communicate over an internet-based user interface with a plurality of users at different levels in the multi-tiered manufacturing supply chain;

(b) receiving to the main processor a request from at least one of the plurality of users to provide by a post-production quality assurance service provider custom quality assurance testing activity on one or more manufactured components or assemblies subject to a contract;

(c) providing the post-production quality assurance service provider an interface to design a custom quality assurance inspection process comprising a series of individual actions and methods, wherein the custom quality assurance inspection process incorporates the environmental and production requirements present within that multi-tiered manufacturing supply chain;

(d) providing the post-production quality assurance provider a repository of predefined activity descriptors ("Elements") to construct individual quality assurance inspection processes of the custom quality assurance inspection process required by the plurality of users within the multi-tiered manufacturing supply chain, the individual quality assurance inspection processes including quality assurance testing instructions;

(e) creating the custom quality assurance inspection process setting out the quality testing activities of steps (c) and (d) to be conducted on the components and assemblies manufactured at each level and inspection criteria to be met to pass inspection based upon information provided by at least one of the plurality of users;

(f) providing the custom quality assurance inspection process to the plurality of users in a plurality of different document mediums at different levels in the multi-tiered manufacturing supply chain for agreement or revision by the plurality of users;

(g) locking the custom quality assurance inspection process;

(h) providing notice to the plurality of users responsive to agreement by the plurality of users to the custom quality assurance inspection process;

(i) the post-production quality assurance provider organizing and coordinating, at a specific location within the multi-tiered manufacturing supply chain, the quality assurance testing activities set out in the custom quality assurance inspection process and receiving and storing the testing data;

(j) providing an interface to the plurality of users to receive and store testing data in the multiple databases relating to the quality testing activities performed, wherein the data is capable of being retrieved by the plurality of users;

(k) releasing, by one or more of the plurality of users, components or assemblies that met the inspection criteria to another tier in the manufacturing supply chain;

(l) applying arithmetic calculations to consolidate and convert quality test data into statistical results delineated by a plurality of user defined criteria selected from the group consisting of product descriptor; defect criteria; time period; assembly; production plant; vendor; and assembler; and (m) allowing a plurality of users to retrieve and review quality test data, formatted and presented by the system, via the user interface.

2. The method of claim 1, further comprising assigning a unique ID number to the contract, and all subsequent data received through the system related to that contract.

3. The method of claim 1, wherein the plurality of document mediums comprises an internet-based user interface delivered by an Application Service Provider (ASP) and a computer-printed version of the contract.

4. The method of claim 3, wherein a user application formats the contract to a size and file-type of common use to facilitate computer printing.

5. The method of claim 1, further comprising applying an electronic signature by a plurality of users via an internet based user interface to execute the contract.

6. The method of claim 5, further comprising establishing a unique electronic signature by a plurality of users upon their first instance of access to the internet based user interface.

7. The method of claim 1, wherein the user interface requires the input of contract details comprising:
resources required to conduct the quality testing activity;
product descriptors specified for quality testing;
quantity of components to be tested; and
a brief description of the criteria to be tested.

8. The method of claim 7, further comprising providing users with open fields in addition to a repository of predefined activity descriptors ("Elements") to construct quality testing instructions.

9. The method of claim 8, wherein Elements, comprising text, images, illustrations, diagrams and/or video, are pre-recorded and available for selection by users through a user interface.

10. The method of claim 8, wherein additional Elements, comprising text, images, illustrations, diagrams and/or video, are recorded and available for selection by subsequent users through a user interface.

11. The method of claim 8, wherein a plurality of Elements contain a plurality of location/customer specific notifications related to the delivery of quality testing activity at that location.

12. The method of claim 9, wherein a plurality of Elements contain a plurality of user warnings to highlight potential hazards in the quality testing process.

13. The method of claim 9, wherein certain of the Elements are flagged a "Risk", requiring the plurality of users to approve the specific Risk through the user interface.

14. The method of claim 13, wherein Elements flagged as Risk automatically generates an email directed to parties authorizing the contract to notify stakeholders of the identified Risk.

15. The method of claim 8, further comprising enabling users to upload images, illustrations, diagrams and/or video to support the understanding of the quality testing instruction.

16. The method of claim 8, further comprising enabling a plurality of users to apply an electronic signature via a user interface to "Approve" the quality test instructions.

17. The method of claim 8, further comprising enabling users to revise quality test instructions to add, remove and/or amend elements.

18. The method of claim 17, wherein the revised quality test instructions are assigned a sequential revision level number, and accessible for review and approval by a plurality of users.

19. The method of claim 17, wherein historical quality test instructions and revisions are available for review by a plurality of users via a user interface.

20. The method of claim 8, further comprising enabling users to assign unique and non-repeating reject codes to specific Elements in the quality test instructions.

21. The method of claim 20, further comprising reviewing assigned reject codes with current and historical quality test instruction revisions to preclude duplication before accepting and storing the input.

22. The method of claim 1, further comprising allowing users to input and store quality test data to a storage medium in a plurality of locations.

23. The method of claim 22, wherein quality test data input is categorized and limited to those components specified in the contract.

24. The method of claim 22, wherein quality test data input is categorized and limited to those reject codes specified in the quality test instructions.

25. The method of claim 1, further comprising allowing the input of resources utilized or consumed during the quality test activity.

26. The method of claim 25, wherein resource data are recorded and allocated to the unique ID established with the contract.

27. The method of claim 1, further comprising formatting the quality test data for computer-printing by a plurality of users.

28. The method of claim 1, further comprising formatting the quality test data for export to an electronic file format in common use for integration with external data processing systems or devices.

29. The method of claim 1, further comprising presenting the plurality of contract, quality test instructions, test data, and resources in a consolidated "dashboard" for a plurality of users to access, review, and approve.

30. The method of claim 1 wherein the released components or assemblies arrive at the another tier in the manufacturing supply chain just before their scheduled use in the supply chain.

31. A non-transitory computer readable medium containing a program product to accumulate and distribute testing data across a multi-tiered manufacturing supply chain wherein components and assemblies are manufactured at different levels in the supply chain, the computer readable medium comprising instructions for enabling a computer system to perform the following:
   (a) receiving at a main processor of the computer system a request to provide by a post-production quality assurance service provider custom quality assurance testing activity on one or more manufactured components or assemblies subject to a contract;
   (b) providing the post-production quality assurance service provider an interface to design a custom quality assurance inspection process comprising a series of individual actions and methods, wherein the custom quality assurance inspection process incorporates the environmental and production requirements present within that multi-tiered manufacturing supply chain;
   (c) providing the post-production quality assurance provider a repository of predefined activity descriptors ("Elements") to construct individual quality assurance inspection processes of the custom quality assurance inspection process required by the plurality of users within the multi-tiered manufacturing supply chain, the individual quality assurance inspection processes including quality assurance testing instructions linked to a unique ID assigned to the contract;
   (d) establishing the custom quality assurance inspection process setting out the quality testing activities of steps (b) and (c) to be conducted on the components and assemblies manufactured at each level and inspection criteria to be met to pass inspection;
   (e) providing the custom quality assurance inspection process to the plurality of users in a plurality of different document mediums at different levels in the multi-tiered manufacturing supply chain for agreement or revision by the plurality of users;
   (f) locking the custom quality assurance inspection process;
   (g) providing notice to the plurality of users responsive to agreement by the plurality of users to the custom quality assurance inspection process;
   (h) recording quality inspection activity data;
   (i) applying arithmetic calculations to consolidate and convert quality test data into statistical results delineated by a plurality of user defined criteria selected from the group consisting of product descriptor; defect criteria; time period; assembly; production plant; vendor; and assembler; and
   (j) displaying quality inspection activity data and outcomes to the plurality of users at the different levels in the supply chain.

32. The non-transitory computer readable medium of claim 31, wherein a contract is created by the program and presented to a plurality of users in a plurality of mediums.

33. The non-transitory computer readable medium of claim 32, wherein the program assigns a unique ID number to the contract, and all subsequent data received through the user application.

34. The non-transitory computer readable medium of claim 32, wherein the plurality of mediums comprises:
   an internet-based user interface delivered by an Application Service Provider (ASP); and
   a computer-printed version of the contract.

35. The non-transitory computer readable medium of claim 31, wherein an electronic signature may be applied by a plurality of users via an internet based user interface to execute the contract.

36. The non-transitory computer readable medium of claim 35, wherein a unique electronic signature is established by a plurality of users upon their first instance of access to the internet based user interface.

37. The non-transitory computer readable medium of claim 31, wherein a user interface requires the input of contract details comprising:
   resources required to conduct the quality testing activity;
   product descriptors specified for quality testing;
   quantity of components to be tested; and
   a brief description of the criteria to be tested.

38. The non-transitory computer readable medium of claim 31, wherein the program provides users with open fields in addition to a repository of predefined activity descriptors ("Elements") to construct quality testing instructions.

39. The non-transitory computer readable medium of claim 38, wherein elements, comprising text, images, illustrations, diagrams and/or video, are pre-recorded to a storage medium and available for selection by users through a user interface.

40. The non-transitory computer readable medium of claim 38, wherein additional elements, comprising text, images, illustrations, diagrams and/or video, may be recorded to a storage medium and available for selection by subsequent users through a user interface.

41. The non-transitory computer readable medium of claim 38, wherein a plurality of elements contain a plurality of user warnings to highlight potential hazards in the quality testing process.

42. The non-transitory computer readable medium of claim 38, wherein a plurality of elements contain a plurality of location/customer specific notifications related to the delivery of quality testing activity at that location.

43. The non-transitory computer readable medium of claim 38, wherein certain of the elements are flagged a "Risk", requiring the plurality of users to approve the specific Risk through the user interface.

44. The non-transitory computer readable medium of claim 43, wherein elements flagged as Risk automatically generates an email directed to parties authorizing the contract to notify stakeholders of the identified Risk.

45. The non-transitory computer readable medium of claim 31, wherein users upload images, illustrations, diagrams and/or video to support the understanding of the quality testing instruction.

46. The non-transitory computer readable medium of claim 31, wherein a plurality of users apply an electronic signature via a user interface to "Approve" the quality test instructions.

47. The non-transitory computer readable medium of claim 31 wherein users revise quality test instructions to add, remove and/or amend elements.

48. The non-transitory computer readable medium of claim 47, wherein the revised quality test instructions are assigned a sequential revision level, and accessible for review and approval by a plurality of users.

49. The non-transitory computer readable medium of claim 47, wherein historical quality test instructions and revisions are available for review by a plurality of users via a user interface.

50. The non-transitory computer readable medium of claim 31, wherein users assign unique and non-repeating reject codes to specific elements in the quality test instructions.

51. The non-transitory computer readable medium of claim 50, wherein the program reviews assigned reject codes with current and historical quality test instruction revisions to preclude duplication before recording the input.

52. The non-transitory computer readable medium of claim 31, wherein a module of the program allows users to input and store quality test data to a storage medium in a plurality of locations.

53. The non-transitory computer readable medium of claim 52, wherein quality test data input is categorized and limited to those components specified in the contract.

54. The non-transitory computer readable medium of claim 52, wherein quality test data input is categorized and limited to those reject codes specified in the quality test instructions.

55. The non-transitory computer readable medium of claim 31, wherein a module of the program allows the input of resources utilized or consumed during the quality test activity.

56. The non-transitory computer readable medium of claim 55, wherein resource data are recorded and allocated to the unique ID established with the contract/work order.

57. The non-transitory computer readable medium of claim 31, wherein quality test data is formatted by the program for computer-printing by a plurality of users.

58. The non-transitory computer readable medium of claim 31, wherein the quality test data is formatted by the program for export to an electronic file format in common use for integration with external data processing systems or devices.

59. The non-transitory computer readable medium of claim 31, wherein the plurality of contract, quality test instructions, test data, and resources, are presented in a consolidated "dashboard" for a plurality of users to access, review, and approve.

* * * * *